(12) United States Patent
Sheriff et al.

(10) Patent No.: US 11,737,048 B2
(45) Date of Patent: Aug. 22, 2023

(54) ADAPTIVE FINE TIMING MEASUREMENT RANGING

(71) Applicant: Cisco Technology, Inc., San Jose, CA (US)

(72) Inventors: Akram I. Sheriff, San Jose, CA (US); Jerome Henry, Pittsboro, NC (US); Robert E. Barton, Richmond (CA); Matthew A. Silverman, Shaker Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 41 days.

(21) Appl. No.: 17/368,676

(22) Filed: Jul. 6, 2021

(65) Prior Publication Data

US 2023/0007976 A1    Jan. 12, 2023

(51) Int. Cl.
| | | |
|---|---|---|
| *H04W 24/00* | (2009.01) | |
| *H04W 64/00* | (2009.01) | |
| *H04W 24/10* | (2009.01) | |
| *H04W 4/02* | (2018.01) | |
| *G01S 11/06* | (2006.01) | |

(52) U.S. Cl.
CPC .......... *H04W 64/003* (2013.01); *G01S 11/06* (2013.01); *H04W 4/023* (2013.01); *H04W 24/10* (2013.01)

(58) Field of Classification Search
CPC ... H04W 64/003; H04W 4/023; H04W 24/10; G01S 11/06
See application file for complete search history.

(56) References Cited

U.S. PATENT DOCUMENTS

| | | | |
|---|---|---|---|
| 10,674,331 B1 * | 6/2020 | Huang | H04W 4/023 |
| 10,945,231 B1 | 3/2021 | Henry et al. | |
| 2017/0238135 A1 | 8/2017 | Vamaraju et al. | |
| 2019/0387389 A1 | 12/2019 | Segev et al. | |
| 2020/0068520 A1 | 2/2020 | Marri Sridhar et al. | |
| 2020/0287763 A1 | 9/2020 | Bhanage et al. | |
| 2022/0078727 A1 * | 3/2022 | Chennichetty | G01S 5/0284 |

FOREIGN PATENT DOCUMENTS

| | | | | |
|---|---|---|---|---|
| WO | WO-2015130712 A1 * | 9/2015 | | G01S 1/08 |
| WO | WO-2018080597 A1 * | 5/2018 | | H04B 7/0404 |

OTHER PUBLICATIONS

U.S. Appl. No. 16/902,038, filed Jun. 15, 2020.
U.S. Appl. No. 16/812,004, filed Mar. 6, 2020.
U.S. Appl. No. 16/812,427, filed Mar. 9, 2020.
PCT Application PCT/US2021/070254 filed Mar. 9, 2021.
U.S. Appl. No. 17/146,362, filed Jan. 11, 2021.
Horn, B. K. P."Doubling the Accuracy of Indoor Location: Frequency Diversity" | Semantic Scholar. pp. 1-12 (Year: 2020)https://www.semanticscholar.org/paper/Doubling-the-Accuracy-of-Indoor-Location%3A-Frequency-Horn/b481c3b109afc933ad0c100da40e8a8b578e3b9.

* cited by examiner

*Primary Examiner* — Erika A Washington
(74) *Attorney, Agent, or Firm* — Patterson + Sheridan, LLP (57) ABSTRACT

A method includes estimating distances between a user device and an access point based on a series of FTM ranging bursts exchanged between the user device and the access point. The method also includes calculating a variance of the estimated distances and in response to determining that the variance exceeds a threshold, instructing the user device to perform an action that reduces the variance. Other embodiments include a device that performs this method.

14 Claims, 3 Drawing Sheets

ADAPTIVE FINE TIMING MEASUREMENT RANGING

TECHNICAL FIELD

Embodiments presented in this disclosure generally relate to distance estimation. More specifically, embodiments disclosed herein relate to adaptive fine timing measurement (FTM) ranging.

BACKGROUND

FTM ranging allows a user device to query ranging from an access point. The user device exchanges a series of FTM ranging bursts with the access point. The access point measures the time intervals between receptions of the FTM ranging bursts to estimate a distance and/or direction from the user device to the access point. There are several issues, however, that negatively affect the accuracy of these estimated distances and directions. For example, if the user device and the access point are located indoors, the FTM ranging bursts may reflect or bounce off walls before reaching the access point. As a result, the access point may receive components of the FTM ranging bursts at different times and with different signal strengths and directionalities, which reduces the accuracy of distances or directions estimated using these FTM ranging bursts.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

According to an embodiment, a method includes estimating distances between a user device and an access point based on a series of FTM ranging bursts exchanged between the user device and the access point. The method also includes calculating a variance of the estimated distances and in response to determining that the variance exceeds a threshold, instructing the user device to perform an action that reduces the variance. Other embodiments include a device that performs this method.

According to another embodiment, a method includes exchanging, with an access point, a series of FTM ranging bursts and receiving, from the access point and based on a variance of estimated distances calculated using the series of FTM ranging bursts, an instruction to perform an action that reduces the variance. The method also includes performing the action in response to the instruction. Other embodiments include a device that performs this method.

Example Embodiments

This disclosure describes an access point that detects inaccurate FTM ranging exchanges and in response, instructs a user device to perform remedial actions. The access point uses exchanges of FTM ranging bursts with a user device to estimate a distance of the user device from the access point. The access point may estimate the distance several times and calculate a variance of these estimated distances. If the variance exceeds a threshold, the access point instructs the user device to perform a remedial action. For example, the access point may instruct the user device to (1) communicate FTM ranging bursts at a reduced rate, (2) use a different a radio or channel to communicate FTM ranging bursts, or (3) connect to a different access point. In some embodiments, the access point maintains several different thresholds and instructs the user device to perform one of these remedial actions depending on which threshold the variance exceeds. In this manner, the access point detects when the estimated distances are inaccurate and attempts to remedy the inaccuracies, in particular embodiments.

Figure 1:
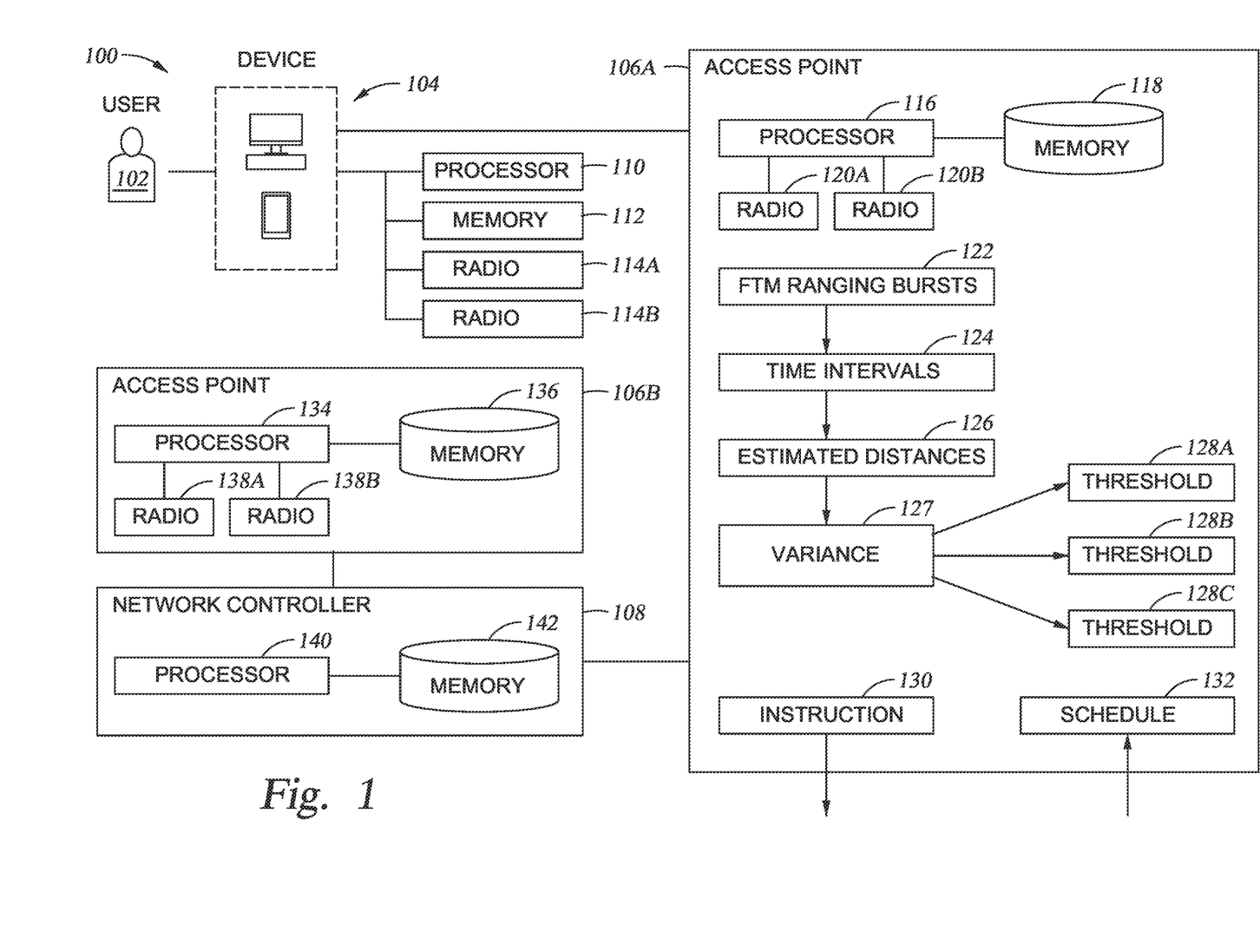
FIG. 1 illustrates an example system.

FIG. 1 illustrates an example system 100. As seen in FIG. 1, the system 100 includes one or more devices 104, one or more access points 106, and a network controller 108. Generally, an access point 106 determines FTM ranging inaccuracies with a device 104 and then instructs the device 104 to take remedial action to reduce the FTM ranging inaccuracies. In this manner, the access point 106 improves the accuracy of estimated distances for the device 104, in particular embodiments.

A user 102 uses the device 104 to connect to a network through an access point 106. The device 104 exchanges FTM ranging bursts with the access point 106 to estimate a location of the device 104. For example, the FTM ranging bursts may be used to estimate a distance and/or a direction of the device 104 relative to the access point 106. In the example of FIG. 1, the device 104 is connected to the access point 106A (e.g., wirelessly connected) and exchanges FTM ranging bursts with the access point 106A. The device 104 includes a processor 110, a memory 112, and one or more radios 114, which are configured to perform any of the functions or actions of the device 104 described herein. For example, a software application designed using software code may be stored in the memory 112 and executed by the processor 110 to perform the functions of the device 104.

The device 104 is any suitable device for communicating with components of the system 100. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user 102.

The processor 110 is any electronic circuitry, including, but not limited to one or a combination of microprocessors, microcontrollers, application specific integrated circuits (ASIC), application specific instruction set processor (ASID), and/or state machines, that communicatively couples to memory 112 and controls the operation of the device 104. The processor 110 may be 8-bit, 16-bit, 32-bit, 64-bit or of any other suitable architecture. The processor 110 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 110 may include other hardware that operates software to control and process information. The processor 110 executes software stored on the memory 112 to perform any of the functions described herein. The processor 110 controls the operation and administration of the device 104 by processing information (e.g., information received from the access point 106 and memory 112). The processor 110 is not limited to a single processing device and may encompass multiple processing devices.

The memory 112 may store, either permanently or temporarily, data, operational software, or other information for the processor 110. The memory 112 may include any one or a combination of volatile or non-volatile local or remote devices suitable for storing information. For example, the memory 112 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 112, a disk, a CD, or a flash drive. In particular embodiments, the software may include an application executable by the processor 110 to perform one or more of the functions described herein.

The device 104 may be a multilink device that communicates over different links using different radios 114. The device 104 may establish different links using these different radios 114 over different bands and different channels. In some embodiments, these device 104 communicates simultaneously over these different links. For example, if the device 104 and the access point 106 are both multilink devices, the device 104 and the access point 106 may communicate with each other over multiple links simultaneously. The device 104 may transmit messages to the access point 106 over one link while the access point 106 transmits messages to the device 104 over another link. As another example, the device 104 may transmit messages to or receive messages from the access point 106 over two links simultaneously.

The device 104 may include any suitable number of radios 114. The radios 114 are communicatively coupled to the processor 110. The processor 110 uses the radios 114 to transmit and receive messages from another device in the system 100 (e.g., the access point 106). In one embodiment, the radios 114 operate over different bands and different channels. For example, the radio 114A may use a frequency that is different from the radio 114B. In some embodiments, the radios 114A and 114B are WiFi radios that communicate over different bands such as the 2.4 gigahertz band, 5 gigahertz band, and the 6 gigahertz band. In certain embodiments, the radios 114A and 114B communicate over different channels of the same frequency band. The multilink device 104 may establish links simultaneously using the radios 114A and 114B. The multilink device 104 may then communicate messages over both links simultaneously. For example, the device 104 may use the radios 114A and 114B to establish two links with the access point 106 simultaneously. The device 104 may then transmit messages to the access point 106 over one link using the radio 114A while receiving messages from the access point 106 over the other link using the radio 114B. In this manner, the device 104 increases message throughput, in particular embodiments.

The access point 106 provides a device 104 access to a network. The device 104 may wirelessly connect to the access point 106 to access the network. In the example of FIG. 1, the system 100 includes an access point 106A and an access point 106B. The access point 106A includes a processor 116, a memory 118, and radios 120A and 120B, which are configured to perform any of the functions or actions of the access point 106A described herein. Additionally, the access point 106B includes a processor 134, a memory 136, and radios 138A and 138B which are configured to perform any of the functions or actions of the access point 106B described herein.

The processors 116 and 134 are any electronic circuitry, including, but not limited to one or a combination of microprocessors, microcontrollers, application specific integrated circuits (ASIC), application specific instruction set processor (ASIP), and/or state machines, that communicatively couples to the memories 118 and 136 and controls the operation of the access points 106. The processors 116 and 134 may each be 8-bit, 16-bit, 32-bit, 64-bit or of any other suitable architecture. The processors 116 and 134 may each include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processors 116 and 134 may each include other hardware that operates software to control and process information. The processors 116 and 134 execute software stored on the memories 118 and 136 to perform any of the functions described herein. The processors 116 and 134 control the operation and administration of the access points 106 by processing information (e.g., information received from the device 104 and the memories 118 and 136). The processors 116 and 134 are not limited to a single processing device and may encompass multiple processing devices.

The memories 118 and 136 may store, either permanently or temporarily, data, operational software, or other information for the processor 116 and 134. The memories 118 and 136 may each include any one or a combination of volatile or non-volatile local or remote devices suitable for storing information. For example, the memories 118 and 136 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memories 118 and 136, a disk, a CD, or a flash drive. In particular embodiments, the software may include an application executable by the processors 116 and 134 to perform one or more of the functions described herein.

The access points 106 may include any suitable number of radios 120 and 138. The radios 120 and 138 are communicatively coupled to the processors 116 and 134. The processors 116 and 134 use the radios 120 and 138 to transmit and receive messages from another device in the system 100 (e.g., the device 104). The radios 120 and 138 operate over different bands and/or different channels. For example, the radios 120A and 138A may use a frequency that is different from the radios 120B and 138B. In some embodiments, the radios 120 and 138 are WiFi radios that communicate over different bands such as the 2.4 gigahertz band, 5 gigahertz band, and the 6 gigahertz band. The access points 106 may establish links simultaneously using the radios 120 and 138. The access points 106 may then communicate messages over both links simultaneously. For example, the access point 106A may use the radios 120A and 120B to establish two links with the device 104 simultaneously. The access point 106A may then transmit messages to the device 104 over one link using the radio 120A while receiving messages from the device 104 over the other link using the radio 120B. In this manner, the access point 106A increases message throughput, in particular embodiments.

The device 104 exchanges FTM ranging bursts 122 with the access point 106A. The FTM ranging bursts 122 include one or more packets or messages communicated by the device 104 to the access point 106A. When the access point 106A receives one or more of the FTM ranging bursts 122, the access point 106A records the times at which the FTM ranging bursts 122 were received. The access point 106A then uses these times to estimate a distance between the device 104 and the access point 106A.

The access point 106A determines time intervals 124 between the receptions of the FTM ranging bursts 122. The time intervals 124 represent the time that lapsed between the receptions of consecutive FTM ranging bursts 122. The access point 106A then uses these time intervals 124 to estimate distances 126 between the access point 106A and the device 104. The larger the time intervals 124, the larger the estimated distances 126. As discussed previously, when the device 104 is indoors, the FTM ranging bursts 122 may bounce or reflect off walls and other obstacles enroute to the access point 106A. These bounces and reflections may introduce delays in the reception of the FTM ranging bursts 122. As a result, the access point 106A may receive components of an FTM ranging burst 122 at different times, with different directionality, and/or with different signal strengths, which makes it difficult for the access point 106A to accurately determine when the FTM ranging burst 122 was actually received. It then becomes difficult for the access point 106A to accurately estimate a distance 126 between the device 104 and the access point 106A. As the access point 106A continues to estimate distances 126 for the device 104 using the FTM ranging bursts 122 from the device 104, the estimated distances 126 may begin varying, sometimes significantly. In some embodiments, the access point 106A averages the distances 126 estimated over a period of time and reports that average to the device 104 as the distance between the device 104 and the access point 106. If the estimated distances 126 vary substantially, then the average may be an inaccurate representation of the actual distance between the device 104 and the access point 106.

The access point 106A calculates a variance 127 of the estimated distances 126. The variance 127 represents the variability in the estimated distances 126, which reveals inaccuracies in the estimated distances 126. The lower the variance 127, the more accurate the estimated distances 126 are. The higher the variance 127, the more inaccurate the estimated distances 126 are.

The access point 106A compares the variance 127 to one or more thresholds 126. In the example of FIG. 1, the access point 106A compares the variance 127 to a threshold 128A, a threshold 128B, and a threshold 128C. The threshold 128B may be larger than the threshold 128A. The threshold 128C may be larger than the thresholds 128A and 128B. Depending on which of these thresholds 128 the variance 127 exceeds, the access point 106A may instruct the device 104 to take different remedial actions to reduce the variance 127.

For example, if the variance 127 exceeds threshold 128C, the access point 106A may instruct the device 104 to connect to another access point 106, such as, for example, the access point 106B, and to perform FTM ranging with the access point 106B. As another example, if the variance 127 exceeds the threshold 128B but not the threshold 128C, the access point 106A may instruct the device 104 to exchange FTM ranging bursts 122 using a different radio or channel. If the FTM ranging bursts 122 had been originally exchanged using the radios 114A and 120A, then the access point 106A may instruct the device 104 to begin exchanging FTM ranging bursts 122 using the radio 114B and the radio 120B. Alternatively or additionally, the access point 106A may instruct the device 104 to exchange FTM ranging bursts 122 over a different channel with a lower variance. In some embodiments, the access point 106A monitors FTM ranging performance over different channels (e.g., different 80 MHz channels) and instructs the device 104 to switch to a channel with better performance than the channel that the device 104 used for FTM ranging. It has been observed that 80 MHz channels often outperform other channels (e.g., 20 MHz and 40 MHz channels), which makes 80 MHz channels preferable for FTM ranging, in certain embodiments. As another example, if the variance 127 exceeds the threshold 128A but not the thresholds 128B and 128C, the access point 106A may instruct the device 104 to reduce a rate at which the device 104 communicates FTM ranging bursts 122. In each of these examples, the remedial actions may reduce the variance 127 and the accuracy of the estimated distances 126. In some embodiments, the access point 106A records the determined distance (e.g., the average of the estimated distances 126) between the device 104 and the access point 106A in response to the variance 127 exceeding one of more of the thresholds 128.

The access point 106A generates and communicates an instruction 130 to the device 104. The instruction 130 is an instruction to perform a remedial action determined by the access point 106A. Using the previous examples, the instruction 130 may instruct the device 104 to connect to the access point 106B, to use a different radio 114 to exchange FTM ranging bursts 122, and/or to reduce a rate at which the device 104 communicates the FTM ranging bursts 122. When the device 104 receives the instruction 130, the device 104 performs the remedial action indicated by the instruction 130.

The network controller 108 services the access points 106A and 106B in the system 100. In particular embodiments, the network controller 108 sets the operating parameters of the access points 106A and 106B. For example, the network controller 108 may communicate a schedule 132 to the access points 106A and 106B. The access points 106A and 106B use the schedule 132 to set the thresholds 128. The network controller 108 may adjust the schedule 132 depending on state information reported by the access points 106A and 106B to the network controller 108. For example, if the access points 106A and 106B report to the network controller 108 that the variances 127 for the devices 104 in the system 100 are increasing, the network controller 108 may reduce the thresholds 128 so that the devices 104 take remedial action sooner. The network controller 108 communicates an updated schedule 132 with the reduced thresholds 128 to the access points 106A and 106B. The access points 106A and 106B then implement the reduced thresholds 128. As seen in FIG. 1, the network controller 108 includes a processor 140 and a memory 142, which are configured to perform any of the functions or actions of the network controller 108 described herein. Further, rather than the access points 106 estimating the distances to the devices, determining the variances, and comparing those variances with the threshold, those tasks can be performed by the network controller 108 which then forwards instructions containing remedial actions to the access points 106 which in turn forward the instructions to the devices 104.

The processor 140 is any electronic circuitry, including, but not limited to one or a combination of microprocessors, microcontrollers, application specific integrated circuits (ASIC), application specific instruction set processor (ASIP), and/or state machines, that communicatively couples to memory 142 and controls the operation of the network controller 108. The processor 140 may be 8-bit, 16-bit, 32-bit, 64-bit or of any other suitable architecture. The processor 140 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 140 may include other hardware that operates software to control and process information. The processor 140 executes software stored on the memory 142 to perform any of the functions described herein. The processor 140 controls the operation and administration of the network controller 108 by processing information (e.g., information received from the access points 106, and memory 142). The processor 140 is not limited to a single processing device and may encompass multiple processing devices.

The memory 142 may store, either permanently or temporarily, data, operational software, or other information for the processor 140. The memory 142 may include any one or a combination of volatile or non-volatile local or remote devices suitable for storing information. For example, the memory 142 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 142, a disk, a CD, or a flash drive. In particular embodiments, the software may include an application executable by the processor 140 to perform one or more of the functions described herein.

Figure 2:
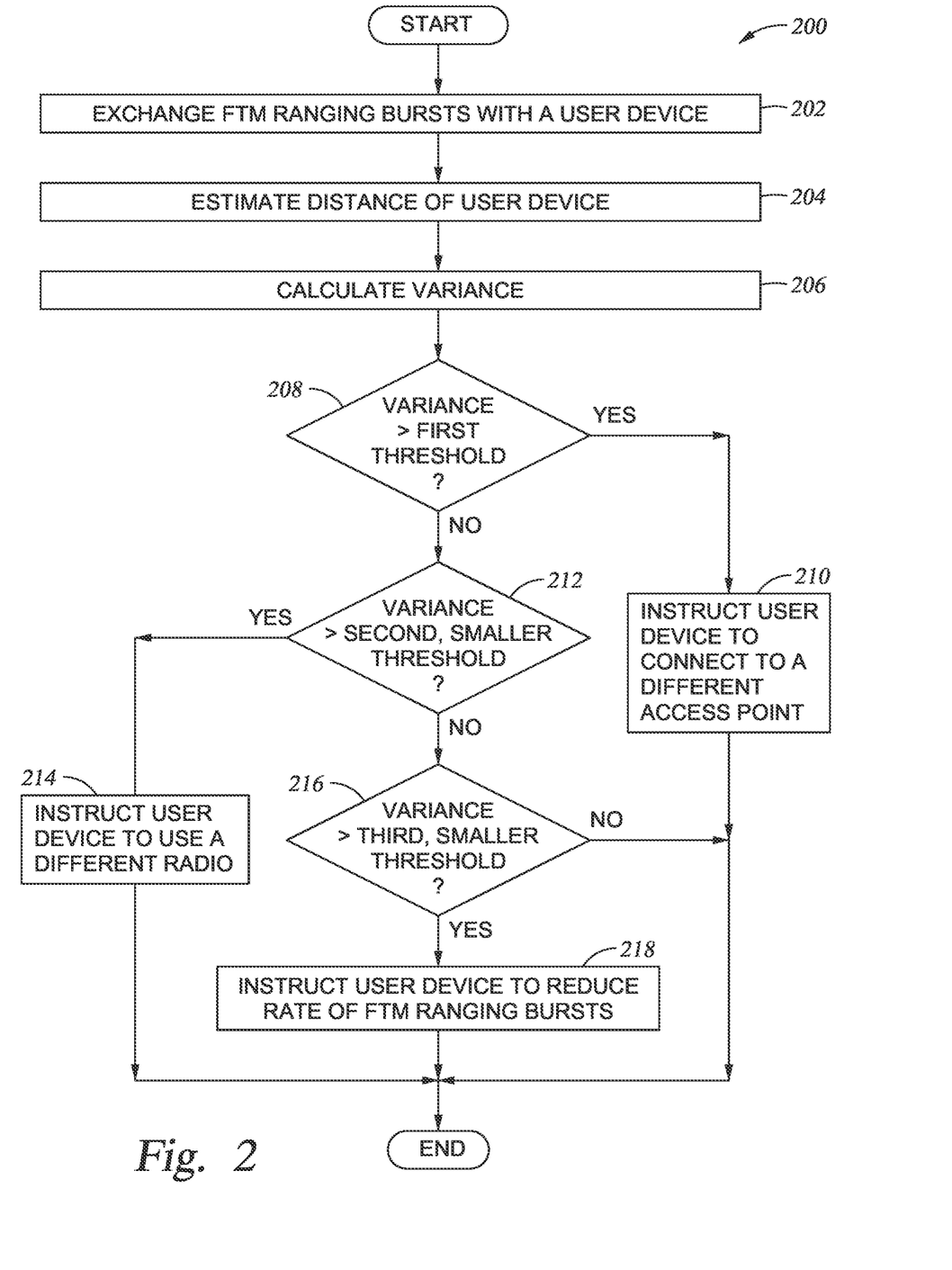
FIG. 2 is a flowchart of an example method performed in the system of FIG. 1.

FIG. 2 is a flowchart of an example method 200 performed in the system 100 of FIG. 1. The access point 106A performs the method 200. In particular embodiments, by performing the method 200, the access point 106A improves the accuracy of FTM ranging in the system 100.

The access point 106A exchanges FTM ranging bursts 122 with a user device 104 in block 202. The device 104 communicates the FTM ranging bursts 122 to the access point 106A. The access point 106A then estimates a distance 126 of the device 104 from the access point 106A in block 204. The access point 106A determines time intervals 124 between the receptions of the FTM ranging bursts 122. The access point 106A then estimates the distances 126 based on the time intervals 124. Generally, the larger the time interval 124, the larger the estimated distance 126 between the device 104 and the access point 106A.

In block 206, the access point 106A calculates a variance 127 of the estimated distances 126. As discussed previously, if the FTM ranging bursts 122 bounce or reflect enroute to the access point 106A, then the access point 106A receives the FTM ranging bursts 122 at inconsistent times and with inconsistent directionality and signal strengths. As a result, the distances 126 estimated based on these FTM ranging bursts 122 may vary substantially, causing an increase in the variance 127. Thus, the variance 127 may be a measure of the inaccuracy of the estimated distances 126.

The access point 106A compares the variance to various thresholds 128 to determine whether the device 104 should take remedial action to improve the accuracy of the estimated distances 126. In block 208, the access point 106A determines whether the variance exceeds a first threshold 128C. If the variance 127 exceeds the first threshold 128C, the access point 106A instructs the device 104 to connect to a different access point 106B in block 210. The different access point 106B may be closer to the device 104 than the access point 106A. Alternatively or additionally, the different access point 106B may have fewer walls or obstacles between itself and the device 104. Each of these factors may allow the different access point 106B to estimate distances 126 with a higher level of accuracy than the access point 106A. In some embodiments, the network controller 108 tracks the locations of the different access points 106 in the system 100 and instructs the access point 106A to instruct the device 104 to connect to the access point 106B because the network controller 108 determines that the location of the access point 106B may provide a more accurate distance estimation (e.g., the access point 106B may be closer to the device 104, the access point 106B may minimize the angle with the access point 106A and the device 104, and/or the access point 106B may form close to a 90-degree angle with the device 104 and the access point 106A). In some embodiments, the access point 106B may be selected because the access point 106B operates over the same frequency bands as the access point 106A and the access points 106A and 106B are assigned to the same multilink operation group.

If the variance 127 does not exceed the first threshold 128C, then the access point 106A determines whether the variance 127 exceeds a second threshold 128B in block 212. The second threshold 128B is smaller than the first threshold 128C. If the variance 127 exceeds the second threshold 128B, then the access point 106A instructs the device 104 to use a different radio 114 to exchange the FTM ranging bursts 122 in block 214. For example, if the FTM ranging bursts 122 were originally exchanged using a first radio 114A of the device 104 and a first radio 120A of the access point 106A, then the access point 106A may instruct the device 104 to switch to a second radio 114B to exchange FTM ranging bursts 122 with a second radio 120B of the access point 106A. The second radio 114B may use a lower frequency band to exchange the FTM ranging bursts 122, which may improve the accuracy of the estimated distances 126.

In some embodiments, the access point 106A instructs the device 104 to use a different channel (e.g., a different 80 MHz channel) to exchange FTM ranging bursts 122. The access point 106A monitors the FTM ranging performance of different channels and instructs the device 104 to switch to a different channel that has a better FTM ranging performance (e.g., lower variance) than the channel that the device 104 used to exchange FTM ranging bursts in block 202.

If the variance 127 does not exceed the second threshold 128B, then the access point 106A determines whether the variance 127 exceeds a third threshold 128A in block 216. The third threshold 128A is smaller than the second threshold 128B. If the variance 127 exceeds the third threshold 128A, then the access point 106A instructs the device 104 to reduce a rate at which the FTM ranging bursts 122 are communicated in block 218. By reducing the rate of the FTM ranging bursts 122, the burst intervals may increase and the frame count in each burst may decrease. As a result, the device 104 may sample over more varied channeled conditions, and also increases the chances that the device 104 has moved by a portion of the channel wavelength, which may reduce the variance 127. If the variance 127 does not exceed the third threshold 128A, then the access point 106A determines that the variance 127 is within acceptable limits and concludes the method 200.

In particular embodiments, the access point 106A instructs the device 104 to take any of the remedial actions in blocks 210, 214 and 218 by communicating an instruction 130 to the device 104. The instruction 130 may indicate the remedial action to be performed by the device 104.

Figure 3:
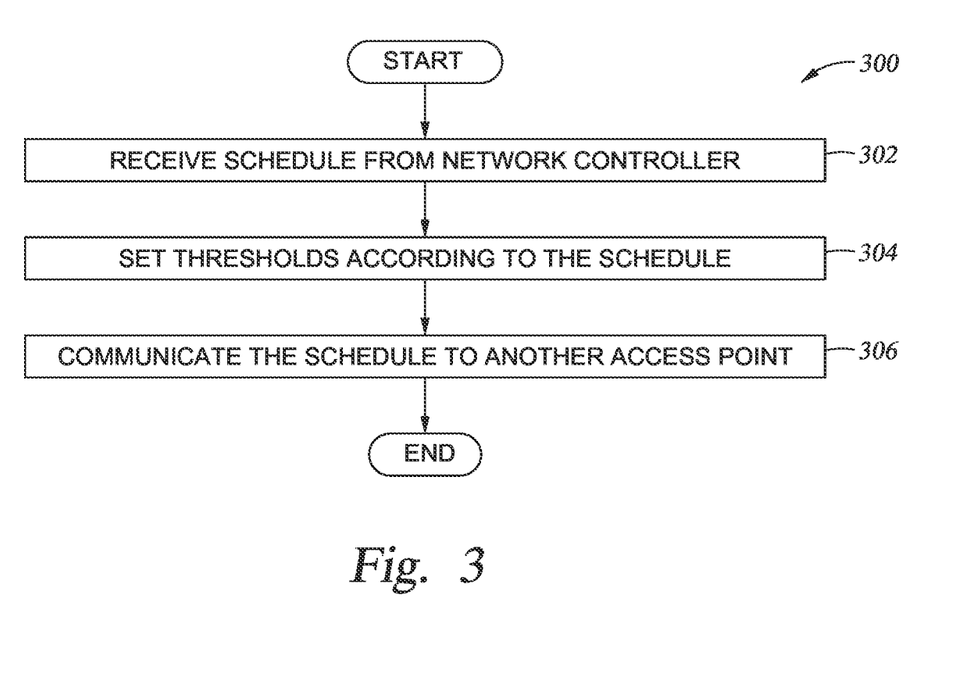
FIG. 3 is a flowchart of an example method performed in the system of FIG. 1.

FIG. 3 is a flowchart of an example method 300 performed in the system 100 of FIG. 1. The access point 106A performs the method 300. In particular embodiments, by performing the method 300, the access point 106A sets the thresholds 128 (e.g., the three thresholds in the method 200) that are used to determine whether remedial action should be taken in the system 100.

In block 302, the access point 106A receives a schedule 132 from a network controller 108. The schedule 132 includes the thresholds 128 that the access point 106A should set. In certain embodiments, the network controller 108 sets the thresholds 128 in the schedule 132 based on statistics and data reported from the access points 106 in the system 100. For example, the network controller 108 may determine that the accuracy of estimated distances 126 in the system 100 is deteriorating. In response, the network controller 108 reduces the thresholds 128 so that remedial actions can be taken sooner to improve the accuracy of the estimated distances 126.

In block 304, the access point 106A sets the thresholds 128 according to the schedule 132. In block 306, the access point 106A communicates the schedule 132 to another access point 106B. In particular embodiments, the access point 106A communicates the schedule 132 to other access points 106 in the system 100 using multilink operation. For example, the access point 106A may be assigned to the same multilink operation group as other access points 106 in the system 100. In one embodiment, the access point 106A shares the schedule 132 with the other access points 106 (e.g., the access point 106B) in the same multilink operation group. In some embodiments, the network controller 108 assigns the access points 106 in the system 100 to their respective rnultilink operation groups. The network controller 108 may group access points 106 based on any suitable factors (e.g., location of the access points 106, frequencies used by the access points 106, coverage areas of the access points 106, etc.).

Figure 4:
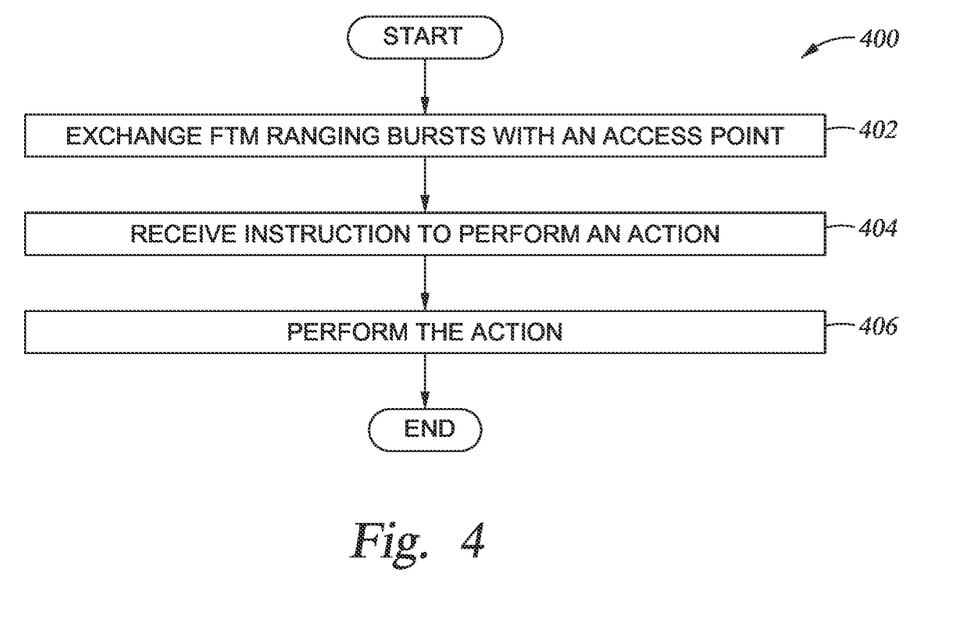
FIG. 4 is a flowchart of an example method performed in the system of FIG. 1.

FIG. 4 is a flowchart of an example method 400 performed in the system 100 of FIG. 1. The device 104 performs the method 400. In particular embodiments, by performing the method 400, the device 104 takes one or more remedial actions to improve the accuracy of estimated distances 126 in the system 100.

In block 402, the device 104 exchanges FTM ranging bursts 122 with an access point 106A. The FTM ranging bursts 122 may be used by the access point 106A to estimate a distance 126 between the device 104 and the access point 106A. The access point 106A then evaluates the variance 127 in the estimated distances 126. If the variance 127 exceeds one or more thresholds 128, then the access point 106A communicates an instruction 130 to the device 104 to take certain remedial actions. In block 404 the device 104 receives the instruction 130 to perform an action. For example, the action may include reducing the rate at which the device 104 communicates the FTM ranging bursts 122, switching radios 114 or channels used to communicate the FTM ranging bursts 122, and/or connecting to a different access point 106B to perform the distance estimation. In block 406, the device 104 performs the action indicated by the instruction 130. In particular embodiments, by performing the action the device 104 reduces the variance 127 and improves the accuracy of the estimated distances 126.

In summary, an access point 106 detects inaccurate FTM ranging exchanges and in response, instructs a user device 104 to perform remedial actions. The access point 106 uses exchanges of FTM ranging bursts with the user device 104 to estimate a distance 126 of the user device 104. The access point 106 may estimate the distance 126 several times and calculate a variance 127 of these estimated distances 126. If the variance 127 exceeds a threshold 128, the access point 106 instructs the user device 104 to perform a remedial action. For example, the access point 106 may instruct the user device 104 to (1) communicate FTM ranging bursts 122 at a reduced rate, (2) use a different a radio 114 or channel to communicate FTM ranging bursts 122, or (3) connect to a different access point 106. In some embodiments, the access point 106 maintains several different thresholds 128 and instructs the user device 104 to perform one of these remedial actions depending on which threshold 128 the variance 127 exceeds. In this manner, the access point 106 detects when the estimated distances 126 are inaccurate and attempts to remedy the inaccuracies, in particular embodiments.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered element or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   estimating distances of a user device from an access point based on a series of fine timing measurement (FTM) ranging bursts exchanged between the user device and the access point;
   receiving, at the access point and from a network controller, a schedule indicating a threshold;
   calculating a variance of the estimated distances; and
   in response to determining that the variance exceeds the threshold, instructing the user device to perform an action that reduces the variance.

2. The method of claim 1, wherein the action is at least one of: (i) communicating FTM ranging bursts at a reduced rate, (ii) using a different radio or channel to communicate FTM ranging bursts, or (iii) connecting to a different access point.

3. The method of claim 2, wherein instructing the user device to communicate FTM ranging bursts at a reduced rate is in response to determining that the variance exceeds a first threshold and wherein instructing the user device to use a different radio to communicate FTM ranging bursts is in response to determining that the variance exceeds a second threshold greater than the first threshold.

4. The method of claim 3, wherein instructing the user device to connect to a different access point is in response to determining that the variance exceeds a third threshold greater than the second threshold.

5. The method of claim 2, wherein the access point and the different access point are assigned to a same multilink operation group.

6. The method of claim 1, further comprising averaging the estimated distances to produce a distance of the user device from the access point.

7. The method of claim 6, further comprising recording the distance of the user device from the access point in response to determining that the variance exceeds the threshold.

8. A network device comprising:
   a memory; and
   a hardware processor communicatively coupled to the memory, the hardware processor configured to:
      estimate distances of a user device from an access point based on a series of FTM ranging bursts exchanged between the user device and the access point;
      calculate a variance of the estimated distances;
      in response to determining that the variance exceeds a first threshold, instruct the user device to communicate FTM ranging bursts at a reduced rate; and
      in response to determining that the variance exceeds a second threshold greater than the first threshold, instruct the user device to use a different radio or channel to communicate FTM ranging bursts.

9. The network device of claim 8, wherein instructing the user device to connect to a different access point is in response to determining that the variance exceeds a third threshold greater than the second threshold.

10. The network device of claim 8, the hardware processor further configured to receive, from a network controller, a schedule indicating the first threshold.

11. The network device of claim 8, the hardware processor further configured to average the estimated distances to produce a distance of the user device from the access point.

12. The network device of claim 11, the hardware processor further configured to record the distance of the user device from the access point in response to determining that the variance exceeds the first threshold.

13. A method comprising:
   exchanging, with an access point, a series of FTM ranging bursts;
   receiving, from the access point and based on a variance of estimated distances calculated using the series of FTM ranging bursts, an instruction to perform an action that reduces the variance, wherein the action is at least one of: (i) communicating FTM ranging bursts at a reduced rate, (ii) using a different a radio or channel to communicate FTM ranging bursts, or (iii) connecting to a different access point assigned to a same multilink operation group as the access point; and
   performing the action in response to the instruction.

14. The method of claim 13, wherein the instruction is received based on the variance exceeding a threshold.

* * * * *

UNITED STATES PATENT AND TRADEMARK OFFICE
CERTIFICATE OF CORRECTION

| | | |
|---|---|---|
| PATENT NO. | : 11,737,048 B2 | Page 1 of 1 |
| APPLICATION NO. | : 17/368676 | |
| DATED | : August 22, 2023 | |
| INVENTOR(S) | : Akram I. Sheriff et al. | |

It is certified that error appears in the above-identified patent and that said Letters Patent is hereby corrected as shown below:

In the Specification

In Column 3, Line 1, delete "(ASID)," and insert -- (ASIP), --.

In Column 5, Line 63, delete "126." and insert -- 128. --.

In Column 9, Line 49, delete "rnultilink" and insert -- multilink --.

Signed and Sealed this
Fifth Day of December, 2023

Katherine Kelly Vidal
*Director of the United States Patent and Trademark Office*